(12) United States Patent
Riley

(10) Patent No.: US 7,828,450 B2
(45) Date of Patent: Nov. 9, 2010

(54) ADJUSTABLE SUNSHADE ASSEMBLY

(76) Inventor: Lou Riley, 3911 SW. 47th Ave., Suite 914, Ft. Lauderdale, FL (US) 33314

( * ) Notice: Subject to any disclaimer, the term of this patent is extended or adjusted under 35 U.S.C. 154(b) by 108 days.

(21) Appl. No.: 11/859,787

(22) Filed: Sep. 23, 2007

(65) Prior Publication Data

US 2009/0080083 A1    Mar. 26, 2009

(51) Int. Cl.
*G02B 23/16* (2006.01)
(52) U.S. Cl. ........................... 359/612; 359/611
(58) Field of Classification Search .......... 359/601, 359/611, 612; 42/129; 396/354, 449, 452, 396/495
See application file for complete search history.

(56) References Cited

U.S. PATENT DOCUMENTS

| | | | | |
|---|---|---|---|---|
| 5,105,312 | A * | 4/1992 | Tiffen et al. | 359/892 |
| 6,867,932 | B2 * | 3/2005 | Noguchi | 359/739 |
| 2002/0191282 | A1 * | 12/2002 | Edwards | 359/399 |
| 2006/0048432 | A1 * | 3/2006 | Staley | 42/122 |
| 2006/0276072 | A1 * | 12/2006 | Fukasawa | 439/397 |

* cited by examiner

*Primary Examiner*—Joshua L Pritchett
(74) *Attorney, Agent, or Firm*—King & Spalding L.L.P.

(57) ABSTRACT

An apparatus for sun shielding for telescopic sights and binoculars incorporating a shutter mechanism to both protect the sighting system and to vary the light entering the sighting system.

18 Claims, 10 Drawing Sheets

7        8              9    10

ADJUSTABLE SUNSHADE ASSEMBLY

TECHNICAL FIELD

This invention relates generally to sun shielding for telescopic sights and binoculars.

BACKGROUND

The use of telescopic sights on weapons is well known and widely practiced. Certain problems are inherent in the use of these sights, however, and these problems have tended to make many hunters and sportsman refrain from using them. Conventional scope shade devices extend outwardly from the scope objective lense assembly, increasing the bulk and weight of the rifle/scope combination. Conventional scope shade devices are often designed to screw into the objective end of the scope assembly however there are a variety of objective diameters and no standard screw pitch between manufacturers, rendering the adaptation of a scope shade to a scope proprietary to each scope. Consequently, a need has been felt for providing a device which allows for convenient shading of sunlight when using a rifle scope so as to improve the optics when used in bright light. Thus, there is a need in the art for a sunshade that can overcome the above-described problems.

SUMMARY

The invention is to provide an improved sun shade for a telescopic sight, binoculars or other lensed sighting systems.

The assembly provides for a more efficient and cheaper design by having less parts and rendering the shade integral to the telescopic sight.

A further advantage of this invention is to vary the amount of light entering the aperture of the sight to reduce glare.

A further advantage of this invention is that by partially closing the scope shade, a shooter may align a red-dot or electronic sight mounted on the firearm with the bore of the scope or confirm that such alignment exists.

Further advantages include lens protection from dust, physical damage and adverse weather conditions, as well as glare reduction and field-of-view adjustments.

Other advantages will be apparent from the following description, the accompanying drawings and the appended claims.

DETAILED DESCRIPTION

In the following detailed description, reference is made to various specific embodiments in which the invention may be practiced. These embodiments are described with sufficient detail to enable those skilled in the art to practice the invention, and it is to be understood that other embodiments may be employed, and that changes may be made without departing from the teachings of the invention.

Figure 1A:
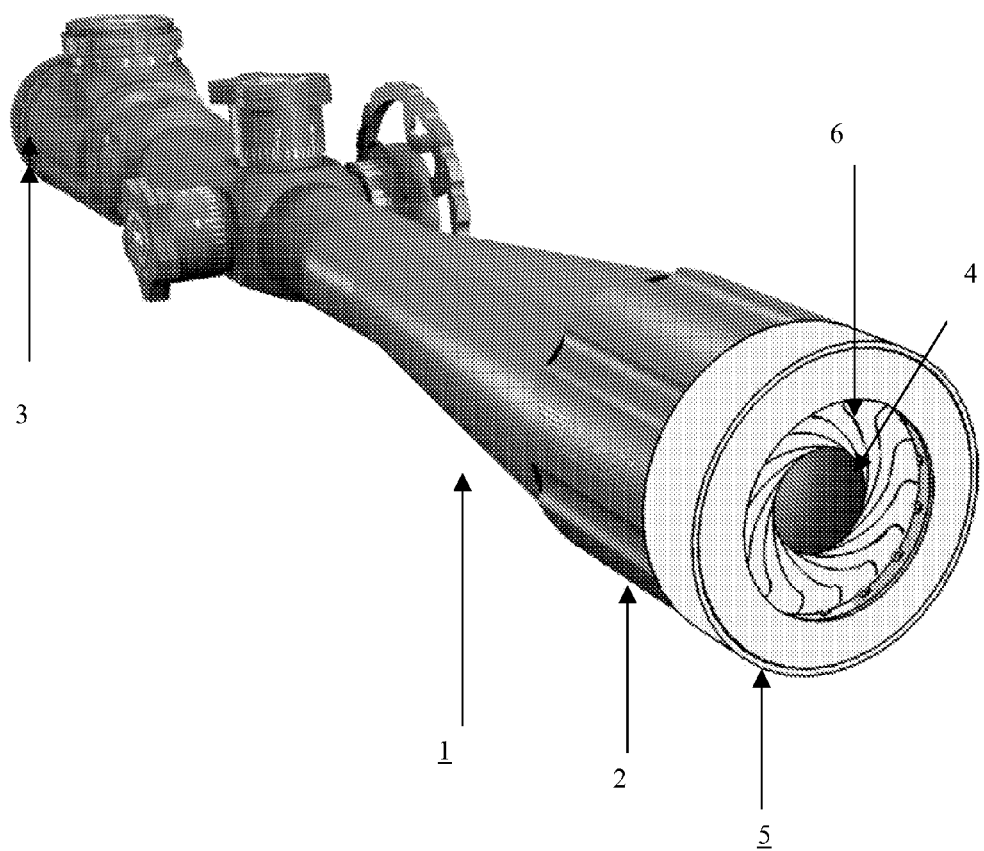
FIG. 1A is a view of the invention incorporated into a riflescope according to an exemplary embodiment described herein.
Figure 1B:
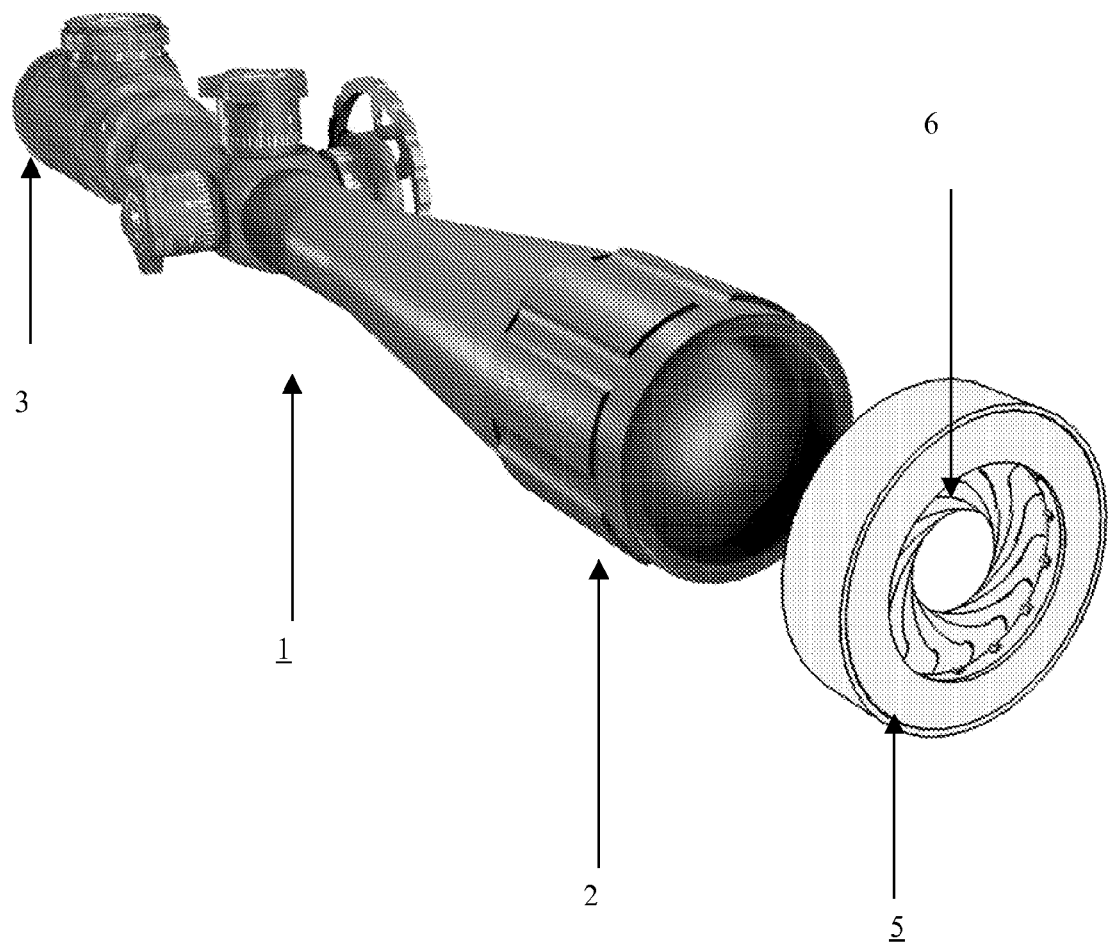
FIG. 1B is a view of the invention conceptually removed from a riflescope according to an embodiment described herein.
Figure 2A:
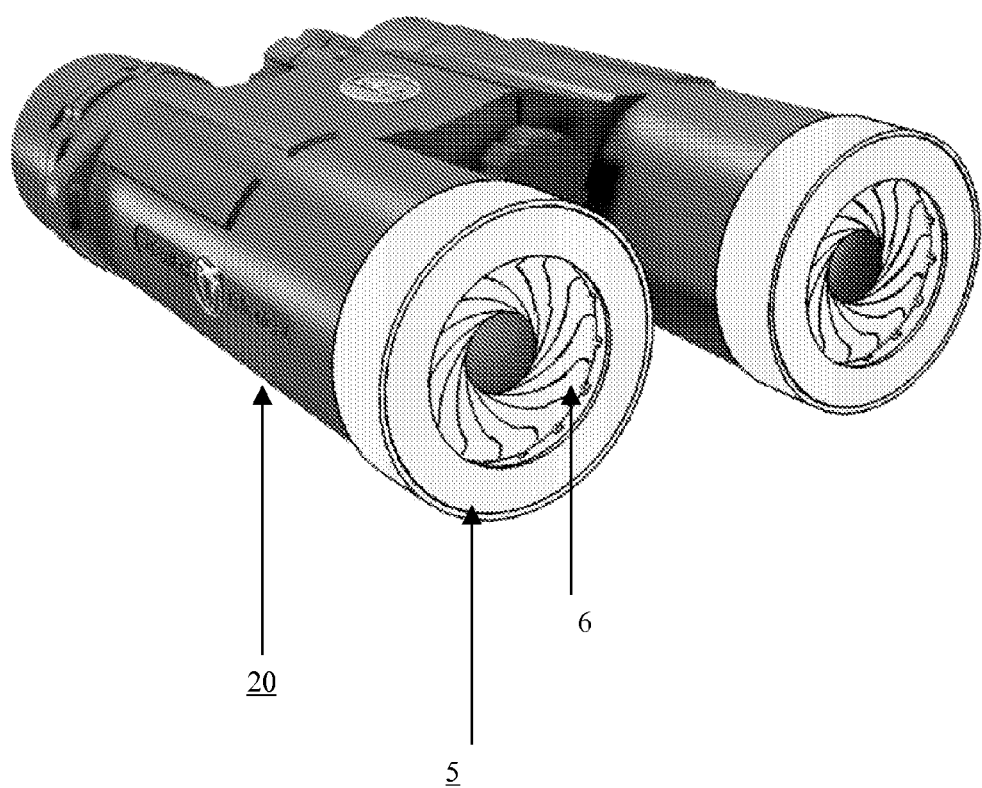
FIG. 2A is a view of the invention incorporated into a binocular according to an exemplary embodiment described herein.
Figure 2B:
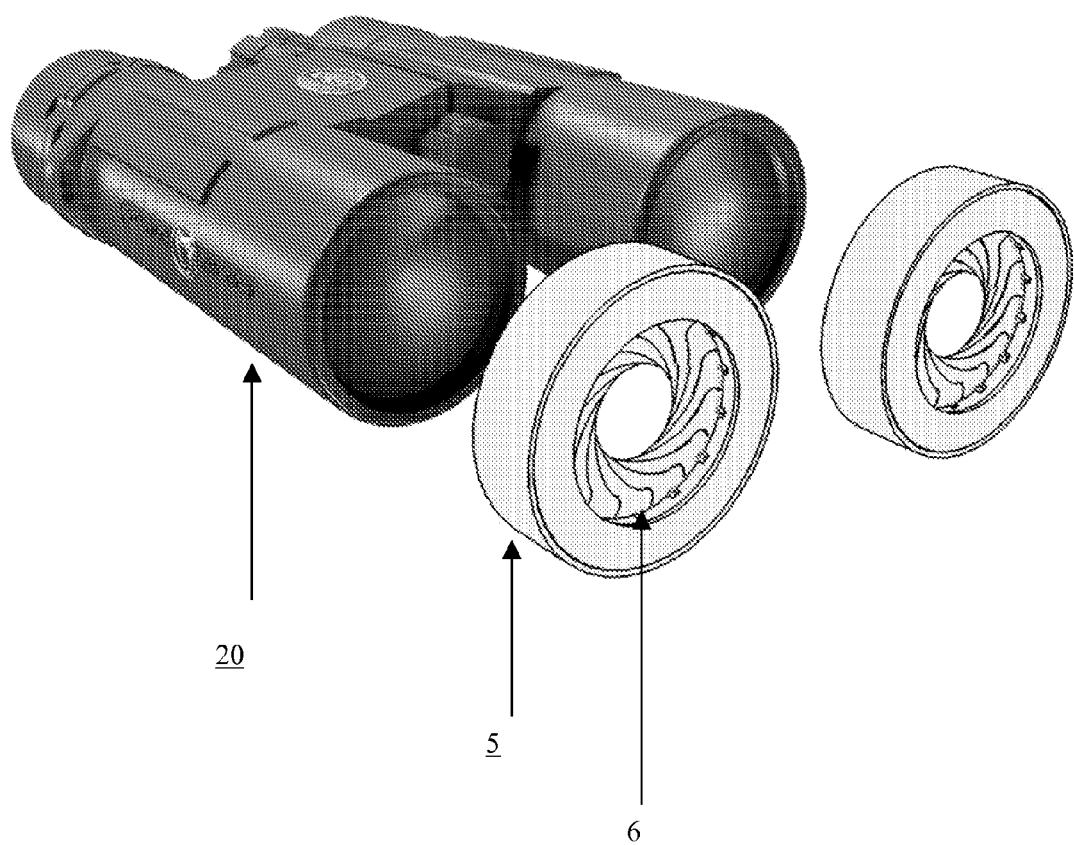
FIG. 2B is a view of the invention conceptually removed from a binocular according to an exemplary embodiment described herein.
Figure 3A:
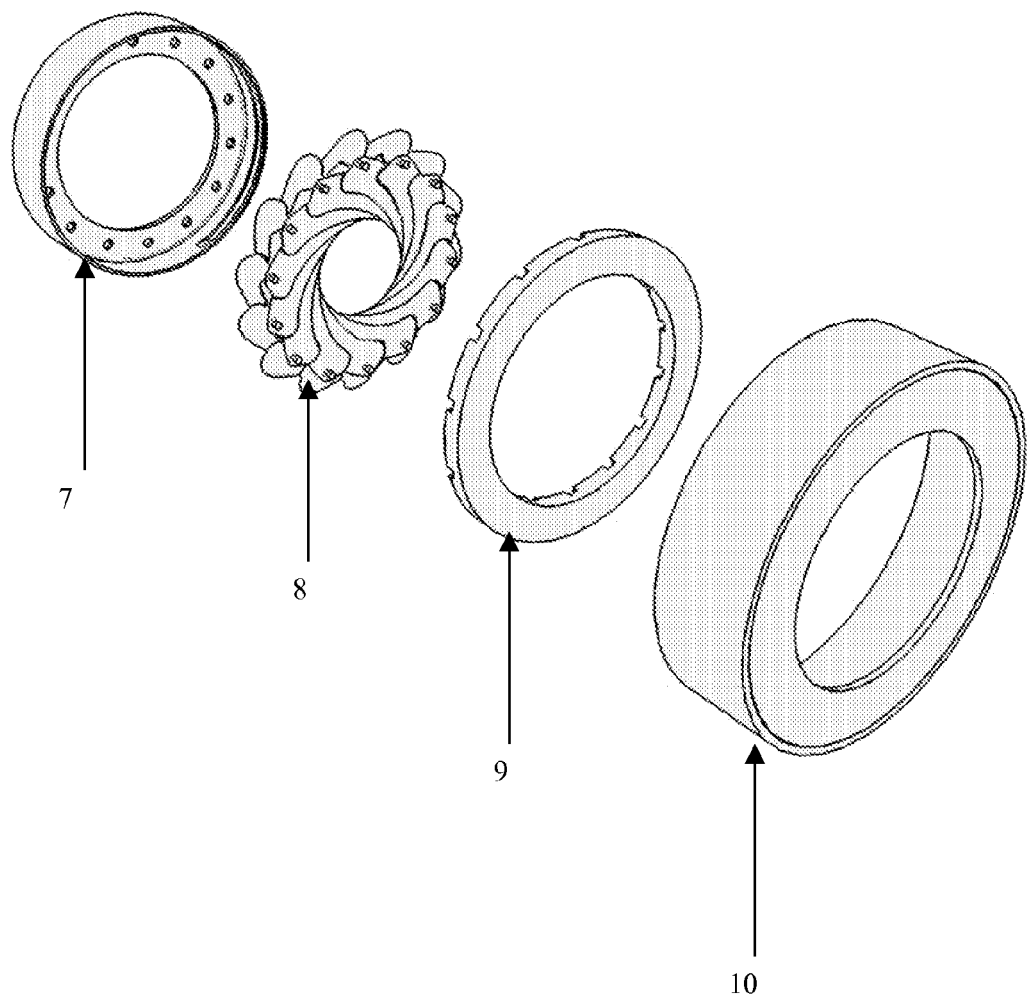
FIG. 3A is an exploded view of the scope shade mechanism described herein.
Figure 3B:
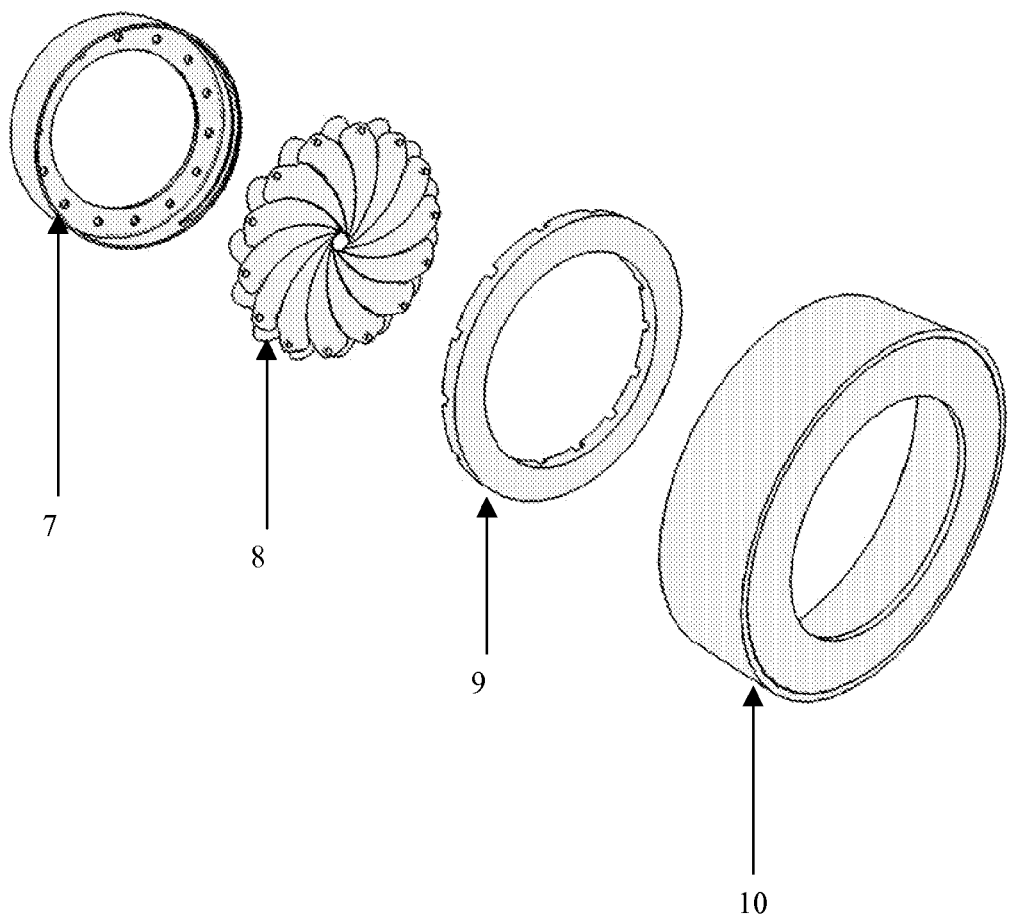
FIG. 3B is an alternative exploded view of the scope shade mechanism described herein.
Figure 4:
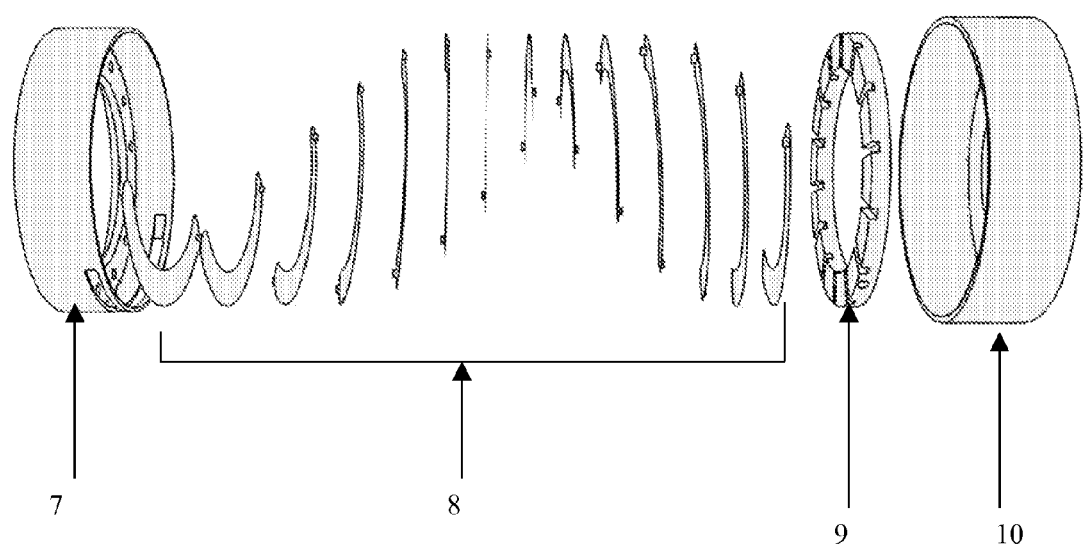
FIG. 4 is another perspective exploded view of the scope shade mechanism described herein.
Figure 5A:
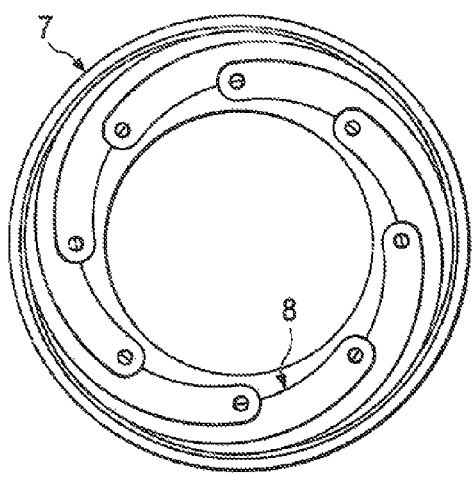
FIGS. 5A-5D are views of the sunshade showing a cross-section of blade positions.
Figure 5B:
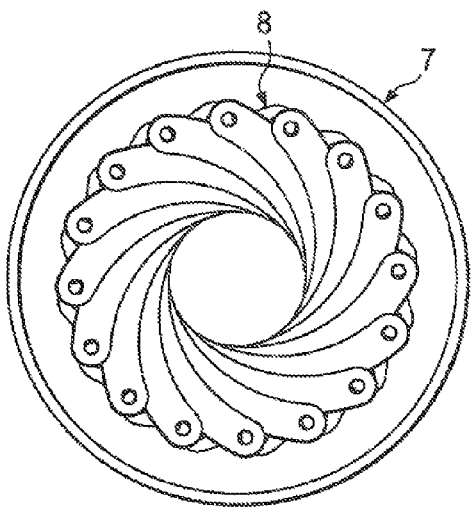
Figure 5C:
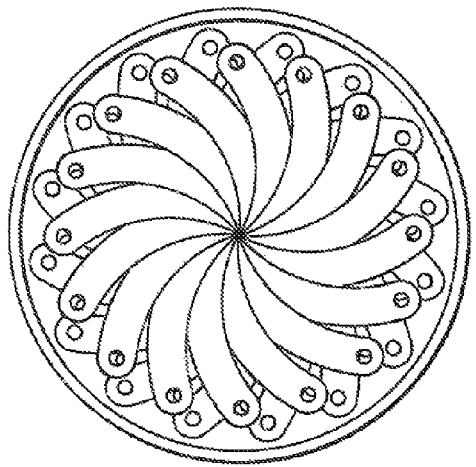
Figure 5D:
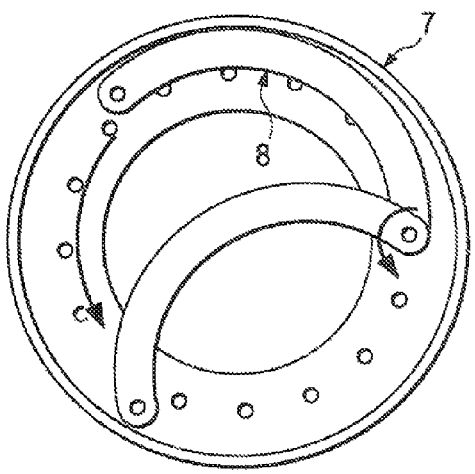
Figure 6A:
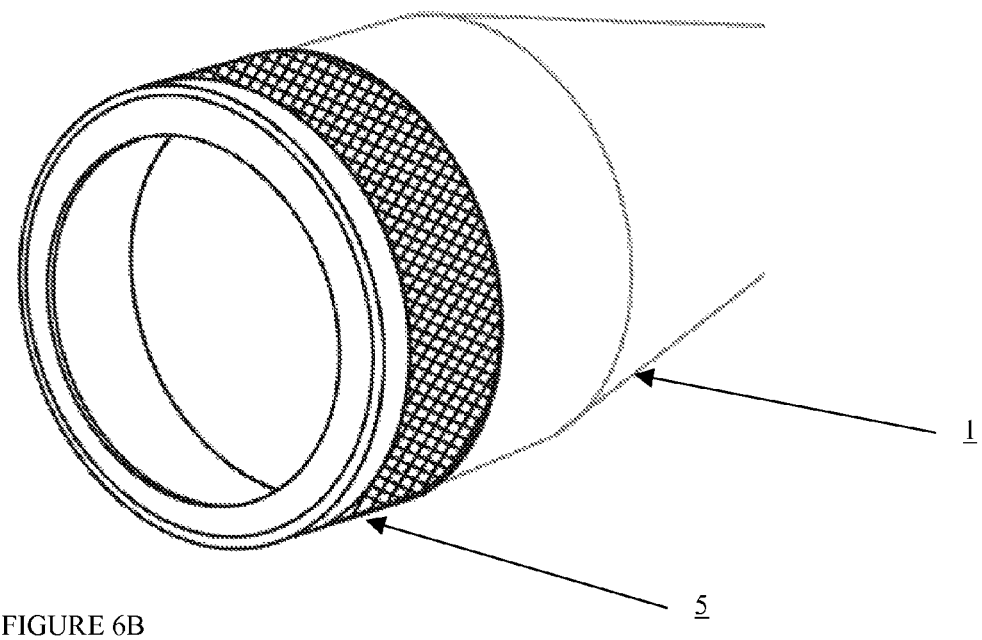
FIGS. 6A-6C are views of the sunshade in operation, depicting various aperature openings.
Figure 6B:
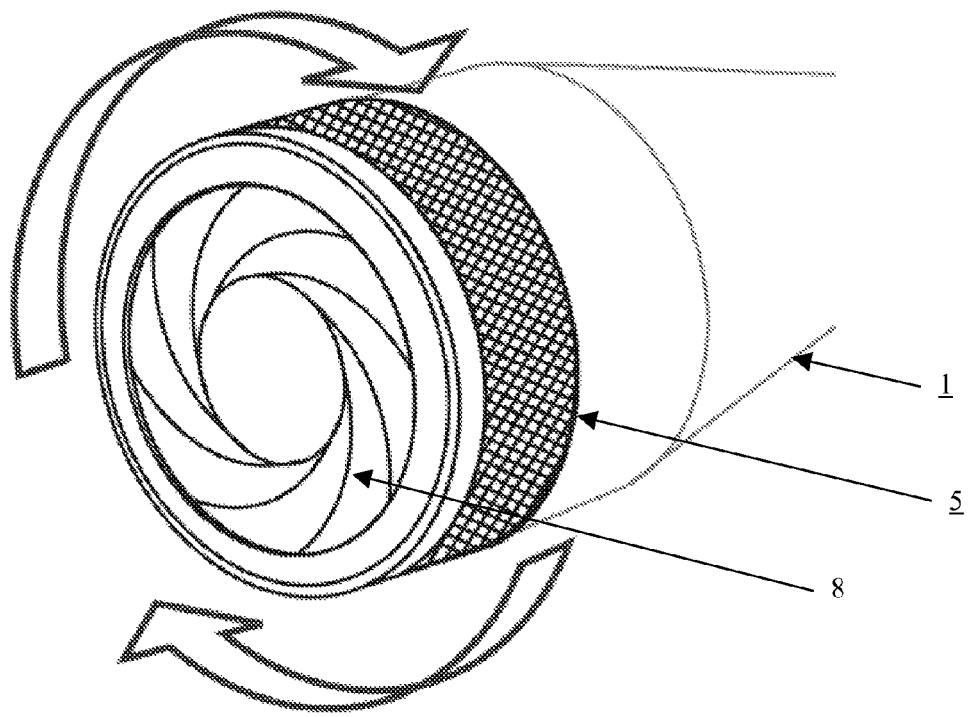
Figure 6C:
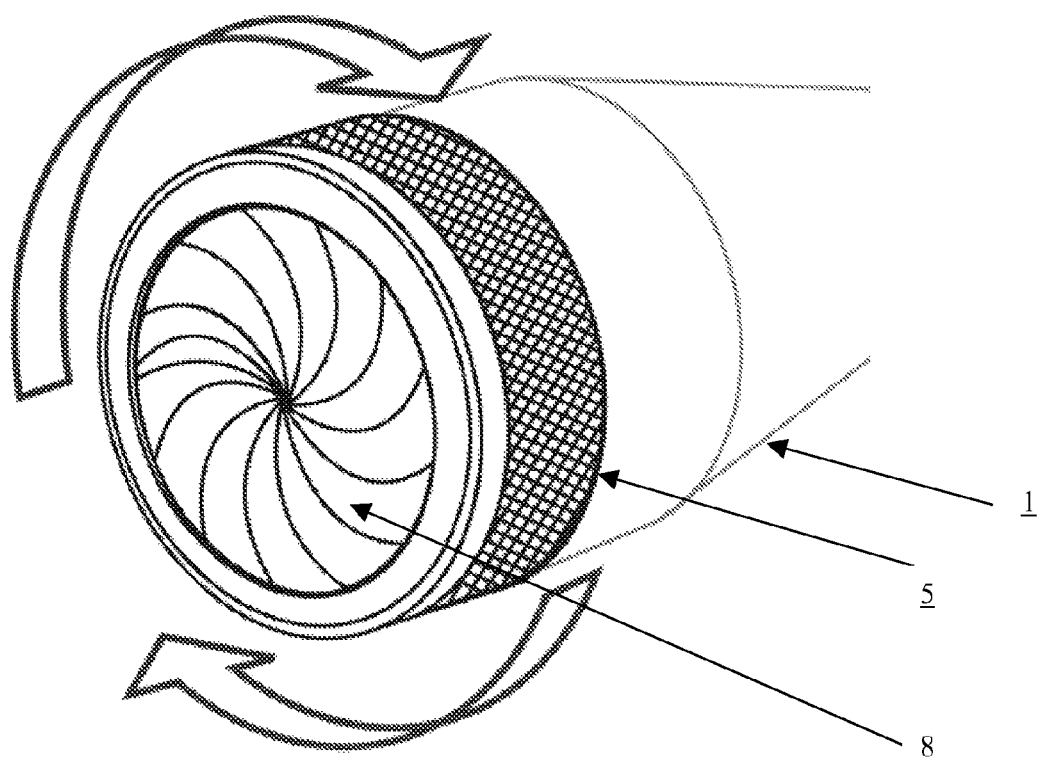

FIG. 1A depicts a telescopic sight assembly (1). The telescopic sight has an anterior end (2) and posterior end (3) with an ocular lens (not shown) located at the posterior end and an objective lens (4) located at the anterior end. A sunshade assembly (5) for reducing glare is integrally and operably connected proximate the anterior end (1) proximate the lens. A sunshade may also be operably connected to the posterior end (3) as desired. The same mechanisms and components may be applied, rendering an adjustable sunshade at the posterior end for purposes of lens protection from dust, physical damage and adverse weather conditions, as well as glare reduction and field-of-view adjustments. The shade (6) is adjustable such that adjusting the shade increases or decreases the aperture of the lens. FIG. 1B shows the sunshade assembly removed from the telescopic sight. In practice, the sunshade assembly may be releasably secured to the telescopic sight or manufactured integral with the sight. FIGS. 2A and 2B show the sunshade assembly as applied to binoculars (20). The sunshade assembly (5) comprises a shutter ring (7) to which a blade (8) is attachedly affixed at one end and traverses the shutter ring, as depicted in FIG. 5d. In practice, multiple blades (8) are utilized, as displayed in FIG. 4, to adjust the lens aperature. FIG. 3A depicts the blades (8) configured in a partially open position while FIG. 3B depicts the blades (8) in a substantially closed position. FIGS. 5A-5C depict the blades in a fully open position (FIG. 5A), partially closed position (FIG. 5B) and fully closed position (FIG. 5C). The shutter ring is fixedly positioned coaxial with the lens and positioned between an external light source, such as sunlight, and the lens. The sunshade further comprises a shutter body (10) to contain the shutter ring (7) and blade (8) as indicated in an exploded view as shown in FIGS. 3A, 3B and 4. The shutter body is operably connected proximate the anterior end (2) proximate the lens and contains the shutter ring (7) in coaxial relation to the lens. A second end of the blade (8) is attachedly affixed to the shutter body (10). The shutter body may further include a separate vane ring (9) for securing an end of a blade (8) or the vane ring (9) may be integral or formed integral to the shutter body. The shutter body (10) is designed to rotate radially about the longitudal axis of the telescopic sight assembly as indicated in FIGS. 5A-5C and FIGS. 6A-6C. As the shutter body (10) rotates, it moves the blade body (8) to a position covering a portion of the lense, as shown in FIG. 5D. The use of multiple blades affixed between the shutter ring and shutter body, as indicated in FIGS. 5A-5C enables one to adjustably reduce the aperture of the lens about its radial center. The assembly may further incorporate an O-ring between the shutter body and sight housing to seal the assembly from contamination and adverse weather conditions.

Additional advantages, features and modifications will readily occur to those skilled in the art. Therefore, the invention in its broader aspects is not limited to the specific details and embodiments, shown and described herein. Accordingly, various modifications may be made without departing from the spirit or scope of the general inventive concept as defined by the appended claims and their equivalents.

What is claimed is:

1. An optic assembly comprising:
a housing;
at least one lens housed in the housing; and
a shade operably connected to the housing and positioned between a light source and the lens, the shade comprising:
  a shutter body;
  a shutter ring; and
  a blade having a first coupling element and a second coupling element, wherein the first coupling element is coupled to the shutter ring and the second coupling element is coupled to the shutter body such that rotating the shutter body moves the blade thereby adjusting an aperture perimeter, and wherein an edge portion of the blade located between the first and second coupling elements of the blade forms a portion of the aperture perimeter.

2. An optic assembly according to claim 1, wherein the optic assembly is a binocular.

3. An optic assembly according to claim 1, wherein the optic assembly is a laser sight.

4. An optic assembly according to claim 1, wherein the optic assembly is a flashlight or laser light.

5. An optic assembly according to claim 1, wherein the first coupling element of the blade is fixedly or slidably coupled to the shutter ring and the second coupling element is fixedly or slidably coupled to the shutter body.

6. An optic assembly according to claim 1, wherein the first coupling element of the blade is fixedly coupled to the shutter ring and the second coupling element is slidably coupled to the shutter body.

7. An adjustable shade for attachment to a telescopic sight containing a lens, the adjustable shade comprising:
a shutter ring;
a shutter body; and
a blade having a body, a first coupling element, and a second coupling element, wherein the first coupling element is coupled to the shutter ring and the second coupling element is coupled to the shutter body such that rotating the shutter body moves the blade thereby adjusting an aperture perimeter, and wherein an edge portion of the blade located between the first and second coupling elements of the blade forms a portion of the aperture perimeter.

8. An adjustable shade according to claim 7, wherein the telescopic sight is a binocular.

9. An adjustable shade according to claim 7, wherein the telescopic sight is a laser sight.

10. An adjustable shade according to claim 7, wherein the telescopic sight is a flashlight or laser light.

11. An adjustable shade according to claim 7, wherein the shade is integral with the telescopic sight.

12. An adjustable shade according to claim 8, wherein the shade is integral with the binocular.

13. An adjustable shade according to claim 7, wherein the shade comprises more than 1 blade.

14. An adjustable shade according to claim 13, wherein the blades are positioned so as to reduce the aperture upon rotation of the shutter body.

15. An adjustable shade according to claim 13, wherein the blades are positioned so as to reduce the aperture equidistant about a longitudal axis of the telescopic sight.

16. An adjustable shade according to claim 7, wherein the shade further comprises an o-ring positioned on the shutter body so as to seal the shutter body against a sight housing.

17. An adjustable shade according to claim 7, wherein the first coupling element of the blade is fixedly or slidably coupled to the shutter ring and the second coupling element is fixedly or slidably coupled to the shutter body.

18. An adjustable shade according to claim 7, wherein the first coupling element of the blade is fixedly coupled to the shutter ring and the second coupling element is slidably coupled to the shutter body.

* * * * *